Figure 1:
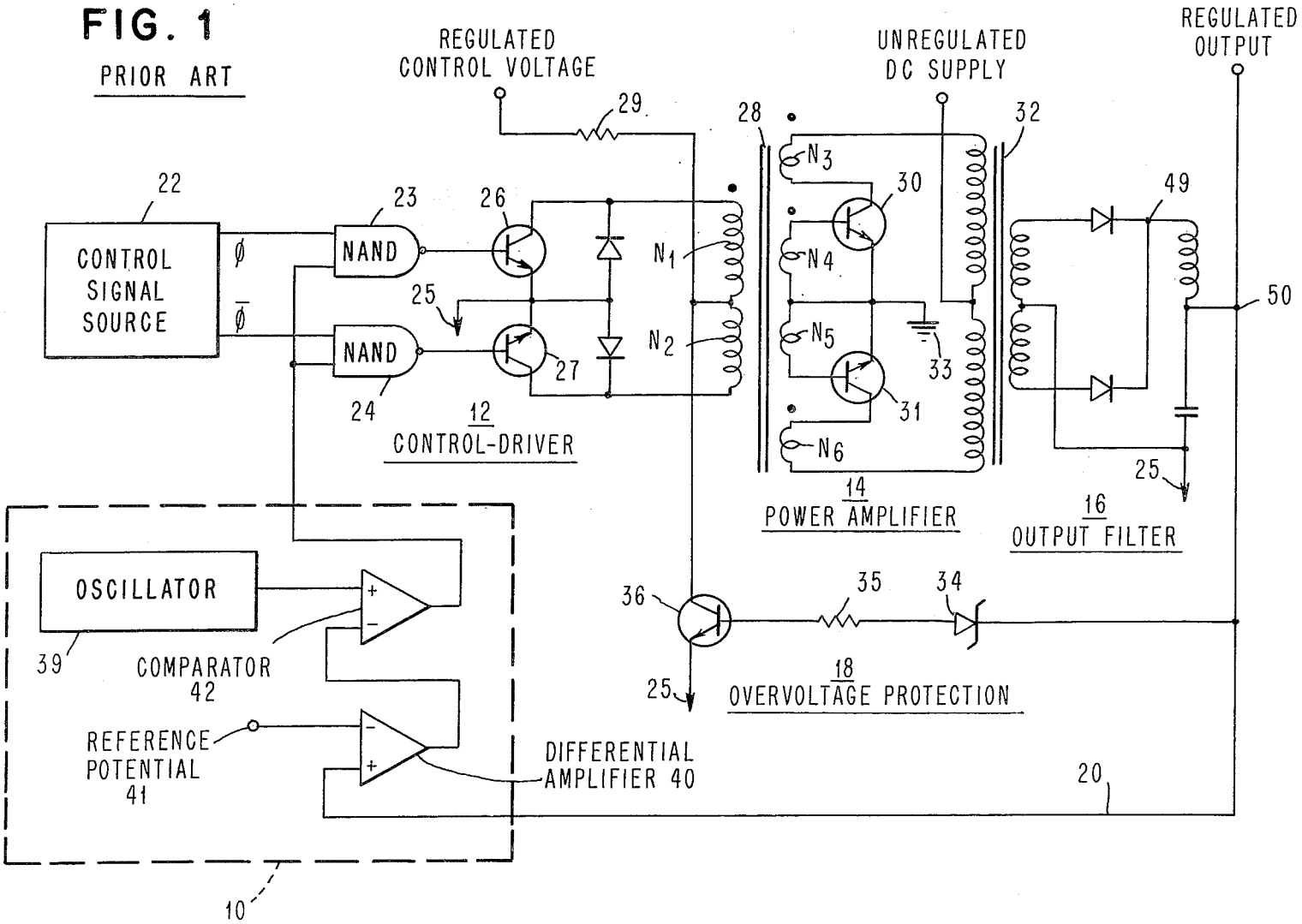
FIG. 1 PRIOR ART
Figure 2:
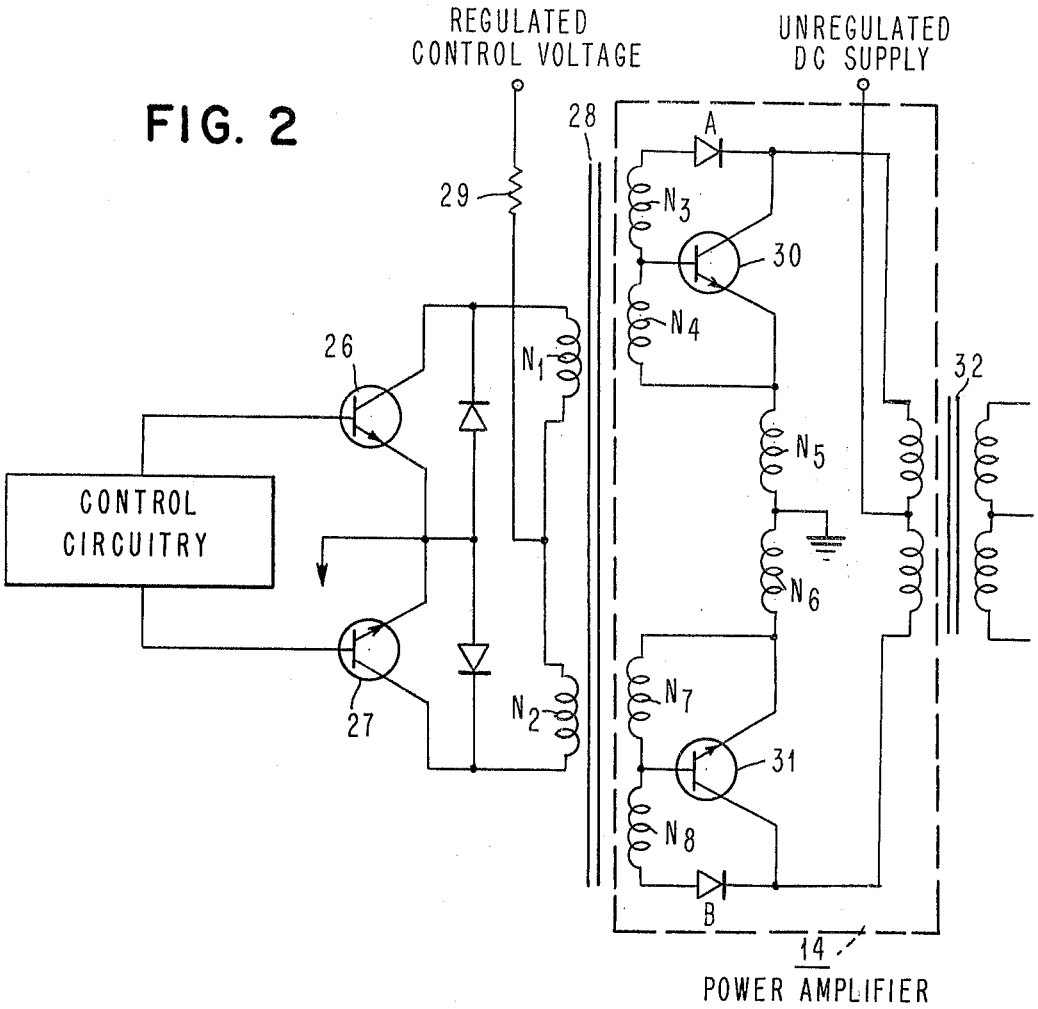
Figure 3:
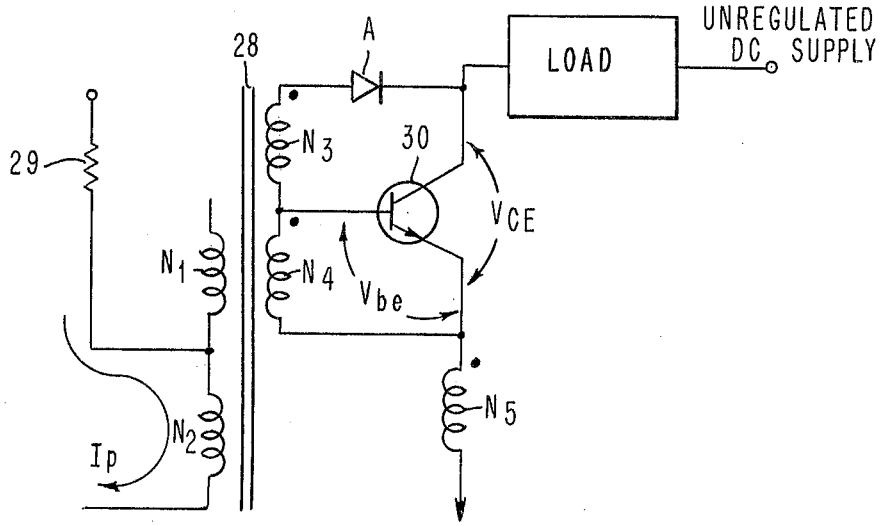

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 7, 1976

950 O.G. 5

T950,004

COLLECTOR CLAMP CIRCUIT

Robert Albert Tuttle, Huntsville, Ala., assignor to International Business Machines Corporation, Armonk, N.Y

Continuation of abandoned application Ser. No. 537,813, Dec. 31, 1974. This application May 30, 1975, Ser. No. 582,537

**Int. Cl.[2] H02M *7/00***

U.S. Cl. 321—26

2 Sheets Drawing. 9 Pages Specification

A collector clamp circuit is disclosed for establishing a fixed current gain for the power transistor in a switching regulator and preventing the power transistor from saturating during conduction while increasing the switching efficiency of the regulator by eliminating losses due to the storage time of the power transistor. The emitter of the power transistor is connected to ground through a first secondary winding of an interstage current transformer. The power transistor is driven by a second secondary winding of the interstage current transformer

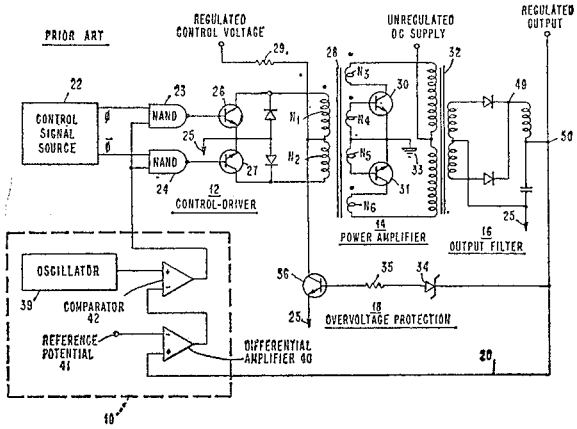

connected across its base-emitter junction. The collector clamp comprises a third secondary winding of the current transformer connected in series with a diode across the base-collector junction of the power transistor. The turns ratio of the second and third transformer windings can be arbitrarily set to hold the collector to emitter voltage of the power transistor at a predetermined level during its conduction period.